United States Patent [19]

Weyermann

[11] 4,020,562
[45] May 3, 1977

[54] METHODS AND APPARATUS FOR THE PREPARATION OF PALE MALT

[76] Inventor: Heinz Weyermann, Paradiesweg 6, 86 Bamberg, Germany

[22] Filed: May 27, 1975

[21] Appl. No.: 581,165

[30] Foreign Application Priority Data

Feb. 13, 1975   Germany ........................ 2505942

[52] U.S. Cl. ............................... 34/12; 34/26; 34/212
[51] Int. Cl.² ........................................ F26B 7/00
[58] Field of Search .................. 34/12, 26, 46, 212

[56] References Cited

UNITED STATES PATENTS

| | | | |
|---|---|---|---|
| 1,711,574 | 5/1929 | Miller | 34/46 X |
| 1,926,772 | 9/1933 | Hess | 34/46 X |
| 3,380,174 | 4/1968 | McClaren | 34/26 |
| 3,527,643 | 9/1970 | Drexler et al. | 34/12 X |

*Primary Examiner*—John J. Camby

[57] ABSTRACT

Green malt is withered in a stream of humidified air heated to a temperature not greater than 60° C and thereafter dried in a stream of air at a temperature of up to 85° C to produce pale malt, in apparatus including a drying kiln, a temperature sensor in the outlet stream of air from said kiln, and a valve operable by the temperature sensor to recycle at least part of said outlet stream of air from said kiln to the air inlet of said kiln.

6 Claims, 3 Drawing Figures

4,020,562

METHODS AND APPARATUS FOR THE PREPARATION OF PALE MALT

FIELD OF THE INVENTION

This invention relates to methods and apparatus for the preparation of pale malt by withering and kiln-drying green malt.

BACKGROUND OF THE INVENTION AND PRIOR ART

In known processes malt is manufactured by treating cereal grains, for example barley, wheat, or rye grains, by a process comprising three stages; steeping, germinating, and kilning or drying. Grains are malted primarily to develop and/or activate enzyme systems such as amylase, which acts both to break down the starch of the cereal grains and to invest the malt product with the ability to convert starch to sugar.

During steeping the grains to be malted are vigorously aerated and stirred in water usually at temperatures in the range 50°-60° F, whereby the grains absorb water over a period of about two days from an initial water content of about 15% to a final water content of about 45%. During steeping the grains begin to respire very rapidly and break down their storage substances e.g. proteins and starch.

During germination, which often takes place over 5-7 days, the grains are converted to "green" malt. The germination conditions, particularly temperature, are controlled to minimise the development of roots and shoots from the grains, while still bringing about the desired enzymic changes in the cereal grains.

The prior art processes for steeping and germination are entirely applicable to the preparation of pale malt by the present invention, and will not be described in any further detail, being very well known to those skilled in the art.

Green malt is completely ready for processing for brewing purposes, except that it still lacks the typical malt aroma. Moreover, it cannot be stored without deterioration for an indefinite length of time. It is therefore subjected to kiln-drying.

Known processes for kiln-drying comprise a first step in which the green malt is withered, and a second step in which the withered malt is further dried. The withering of the green malt must be carried out quickly but carefully, since otherwise the saccharifying enzymes are damaged and there would be a marked deterioration in the quality of the malt. A sufficiently rapid dehydration is produced with an air throughput of 4,000 to 5,000 m³/h and per ton. The temperature of the air introduced into the material to be withered should not exceed +60° C. After approximately 10 hours' withering, the water content of the green malt has usually fallen to about 20%. Since, as is known, the saccharifying enzymes (amylases) in dry malt are much more stable to heat than those in fresh malt, the drying temperature can be raised in steps to 80° and 85° C after the end of the withering process. The final water content of the finished malt should be about 4.5% and should be reached after 18 to 20 hours. After the withering process, i.e. during the kiln drying, saturation of the air with moisture no longer takes place on account of the hygroscopic properties of the malt, and therefore, in order to save energy, the air fed to the material being kiln dried during said further drying includes recycle air, i.e. waste air from the material being dried, as well as fresh air.

According to the teachings of the prior art, the recycling of air has been avoided during the withering step in the production of pale malt, i.e. before the water content of the malt has fallen to about 20%. It is known that the application of high kilning temperatures at high moisture contents increases the colour of the finished malt. For the production of pale malt therefore prior art processes have utilised dry air at temperatures not exceeding 60° C during the withering stage, i.e. before the water content of the green malt has fallen to 20%. In the production of dark malt, however, recycle air has been used during the withering stage of the kilning in order to produce a dark malt colour.

Particularly in the withering stage, which is operated using full ventilation capacity, a relatively high energy consumption is necessary in order to heat the external air used in drying the material to the desired temperature. Another result of the high energy consumption is that the waste air flowing from the dried material should not, according to informed opinion valid up to now, be fed to the newly introduced fresh air as recycle air since the water content therein would only have a deleterious effect on the drying process.

It is desirable to reduce the energy consumption in kiln drying, particularly in the withering of green malt, which is required in treating the fresh air and which is relatively high in the known processes, especially during the colder seasons of the year.

OBJECTS OF THE INVENTION

An object of the invention is a process for withering green malt to produce pale malt, in which optionally heated fresh air is passed through the green malt to be kiln-dried, and a stream of waste air cooled as a result of absorption of moisture leaves the material; wherein the fresh air is humidified.

Another object of the invention is a process for withering green malt which requires up to 25% less energy than heretofore.

A further object of the invention is a process for kiln-drying green malt to produce pale malt, including the steps of withering said green malt by passing a first inlet air stream at a temperature of up to 60° C through said green malt for a time sufficient to wither said malt, whereby a first exhaust air stream containing moist air issues from said malt during said withering; and passing a second inlet air stream through said malt after said withering at a temperature of up to 85° C for a time sufficient to dry the malt; and comprising the improvement of humidifying the air for said first air stream.

In practice in carrying out the process of the invention the highest permissible drying temperature for the material and the heat content relating to this drying temperature is taken as the starting point, with as far as possible 100% atmospheric moisture, or a value slightly above, and the temperature then regulates the conditioning of the fresh air, depending on the temperature of the waste air. The conditioning of the fresh air, especially the addition of moisture, is carried out until the desired temperature for the waste air is reached. It is also possible to add the waste air leaving the material being dried as recycle air to the fresh air, so that the fresh air is suitably conditioned until the desired temperature for the waste air is achieved. The recycle air can be regulated by valves for example. Energy savings of up to 25% have resulted in practice by using the invention.

In the conditioning of the fresh air it is advantageous to pass the recycle air through a heat exchanger and combine the recycle air leaving the heat exchanger with the fresh air, which is likewise passed through the heat exchanger.

In this connection less than 100% of the necessary fresh air is passed through the heat exchanger since both the recycle air leaving the heat exchanger and also the fresh air passed through the heat exchanger are combined and introduced into the kiln. For example, the air introduced into the kiln may comprise about 50% fresh air and about 50% waste air or recycle air, both of which are passed through the heat exchanger.

It is yet a further object of the invention to provide apparatus for carrying out the process of the invention. The apparatus essentially comprises an induction device for fresh air, a kiln for green malt, a conduit pipe for removing the waste air leaving the malt, and a recycle pipe through which the recycle air extracted from the waste air is passed to the heat exchanger and/or fed to the fresh air. One inlet to the heat exchanger can be attached to this recycle air pipe, the other inlet of the heat exchanger being provided with fresh air. The two outlets of the heat exchanger together lead to the suction blower or ventilator, which supplies the kiln with the conditioned fresh air.

The heat exchanger can be connected in parallel to the recycle air pipe so that, according to choice, the recycle air can be combined directly with the fresh air and then passed through the kiln, or the recycle air is first of all passed through the heat exchanger and, after having left the heat exchanger, is combined with the fresh air passed through the heat exchanger and fed to the kiln.

The essential advantage of the invention is seen to be the fact that an increased energy saving is guaranteed in the conditioning of the fresh air before it is introduced into the kiln. Depending on the external temperature, this energy saving may be up to 45% in optimum conditions. It is also an advantage of the invention that existing kilns can be converted, i.e. provided with heat exchangers.

A preferred mode of carrying out the invention will be apparent from the following detailed description given for illustrative purposes and without intent to limit the scope of the invention, reference being had to the accompanying drawings, made a part hereof.

DETAILED DESCRIPTION OF THE DRAWINGS

Figure 1:
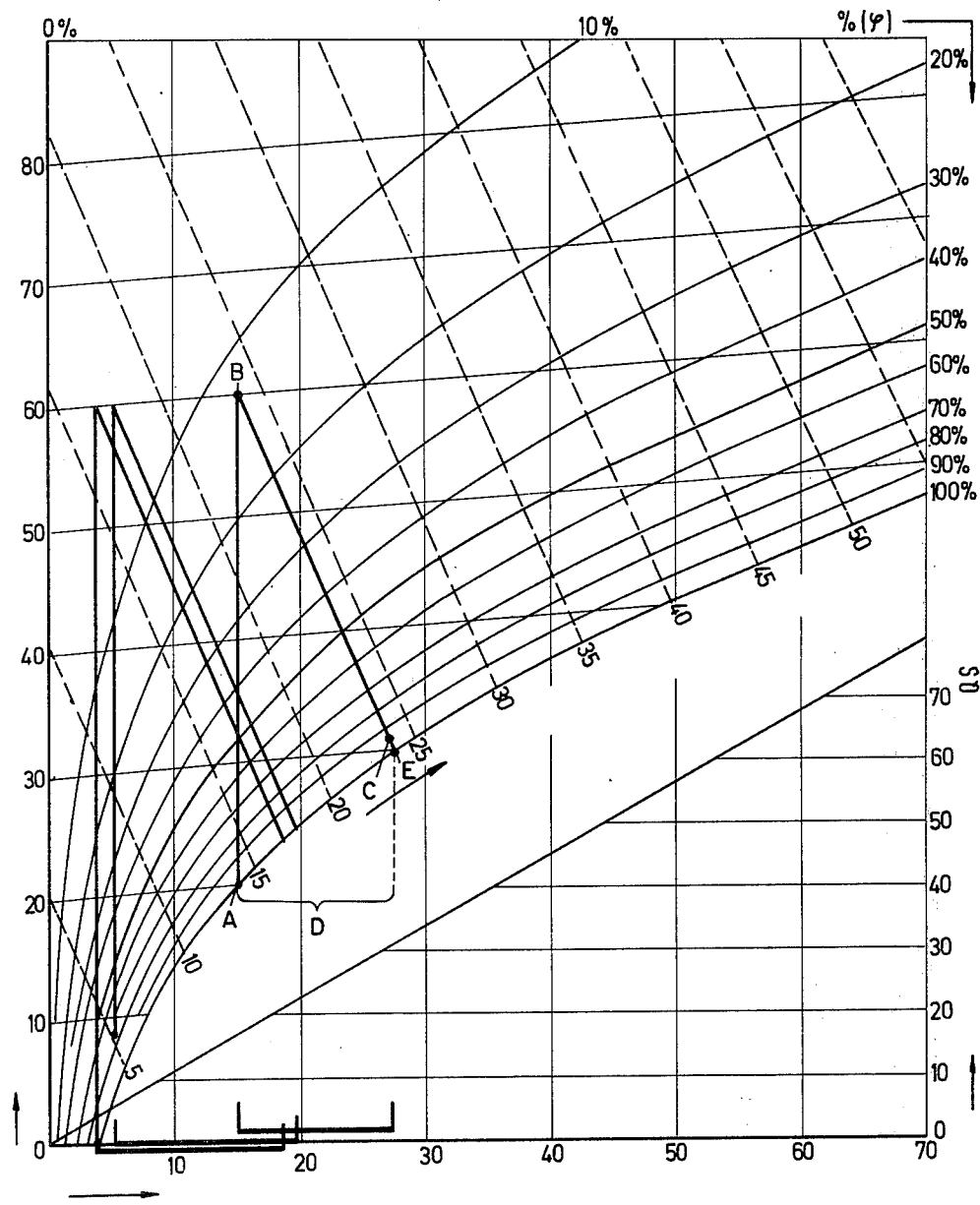
FIG. 1 is a diagram showing in graphical form the relation between temperature, heat content ($i$), water content ($x$), and relative humidity in moist air (according to Mollier)

The process conditions for carrying out the withering process according to the invention can be derived from FIG. 1 of the drawings. It may be assumed that the highest attainable water content (measured temperature in the outside air referred to 100% relative humidity) is that corresponding to 100% relative humidity at 20° C. and shown at point A in FIG. 1. It can be seen from the Mollier $i$-$x$ diagram for moist air which is shown in FIG. 1 that with a highest permissible drying temperature for the material of 60° C (point B), the waste air leaving the material being dried (the relative humidity of the waste air during the withering process is approximately 95% see point C) must be at a temperature of about 30° C. 9.8 kcal/kg are required to heat the air to 60° C, as can also be seen from D in the diagram. Hence it can be seen that when air at 20° C and 100% relative humidity is used for the inlet stream of the withering process, such air has a heat content $i$ of about 14 kcal per kilogram (see point A) of dry air, reference being made to FIG. 1. After heating to 60° C said air has a heat content of about 24 kcal per kilogram of dry air, or more precisely 23.8 kcal per kilogram, as shown at point E. During the drying process the relative humidity of the air rises to about 95% (point C) by uptake of moisture from the malt while its heat content remains substantially unchanged. Reference to FIG. 1 shows that under these conditions the exhaust air stream temperature will be about 30° C. Thus, when carrying out the invention the fresh air which is passed through the material to dry the green malt has a relative humidity of up to 100% or a value slightly above, whereby the temperature is advantageously adjusted as far as possible to the value corresponding to the highest attainable moisture content. This is in contrast to the prior art teachings on the matter and the prior art withering methods in which dry air has been passed through the material being dried. It is believed that in the prior art processes which use very dry air and this produce a rapid removal of moisture from the green malt, a certain "grilling" effect is produced, i.e. the moisture is stripped from the grain interiors and a continuous dehydration does not take place. However, in the invention a continuous dehydration also takes place from the grain interiors as a result of the high moisture content of the air, which is purposely maintained, and a higher degree of effectiveness in the removal of moisture and thus a reduced energy consumption in the preparation of the fresh air is required.

Figure 2:
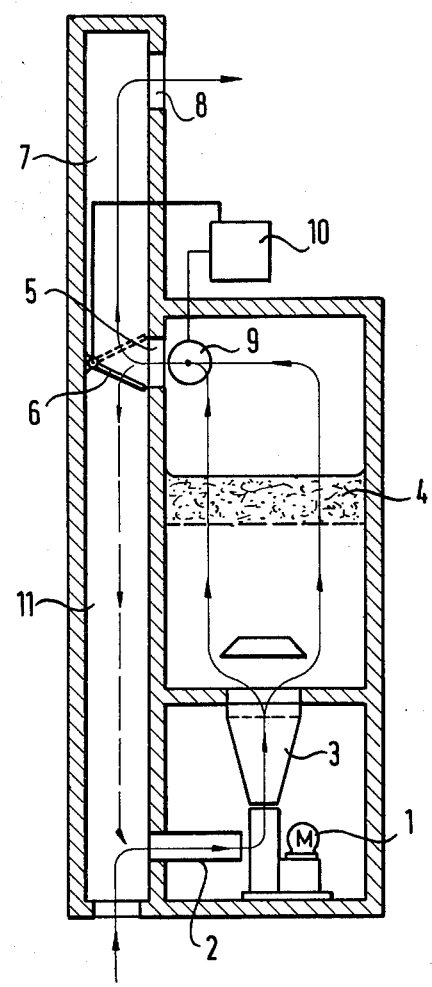
FIG. 2 is a schematic view in cross-sectional side elevation of apparatus for carrying out the kiln-drying process of the invention.

FIG. 2 shows diagrammatically, a kiln for green malt. Fresh air is sucked in from outside in the direction of the arrow, by means of a motor-driven ventilator 1 and through a suction pipe 2, and is passed through the green malt 4. The waste air charged with moisture is passed through the opening 5, which can be closed by a valve 6, and reaches the outside atmosphere via a pipe 7 and an opening 8.

In the invention, a temperature measurement device 9 is placed in the waste air current in order to measure the temperature of the waste air. As can be deduced from the $i$-$x$ diagram of FIG. 1, this temperature must be 30° in the example of the invention illustrated. Depending on this temperature measurement, a valve adjustment motor 10 is regulated, which actuates the valve 6. As a result of the adjustment of the valve, a part or all of the waste air can be recycled through a channel 3 to the suction pipe 2 for the fresh air or even to the blower pipe. The fresh air introduced into the kiln may thus be suitably conditioned so that the highest permissible value of the moisture content is achieved.

It is of course also possible to impart the necessary moisture and temperature to the inducted fresh air at another point.

On account of the existing ventilation, a different value can be set for the relative humidity, for example a value slightly over 100%, say approximately 110 to 120%, in order to increase the degree of effectiveness. Because of the existing ventilation there is no formation of mist or rain, which might otherwise occur on account of the supersaturation of the drying air.

Figure 3:
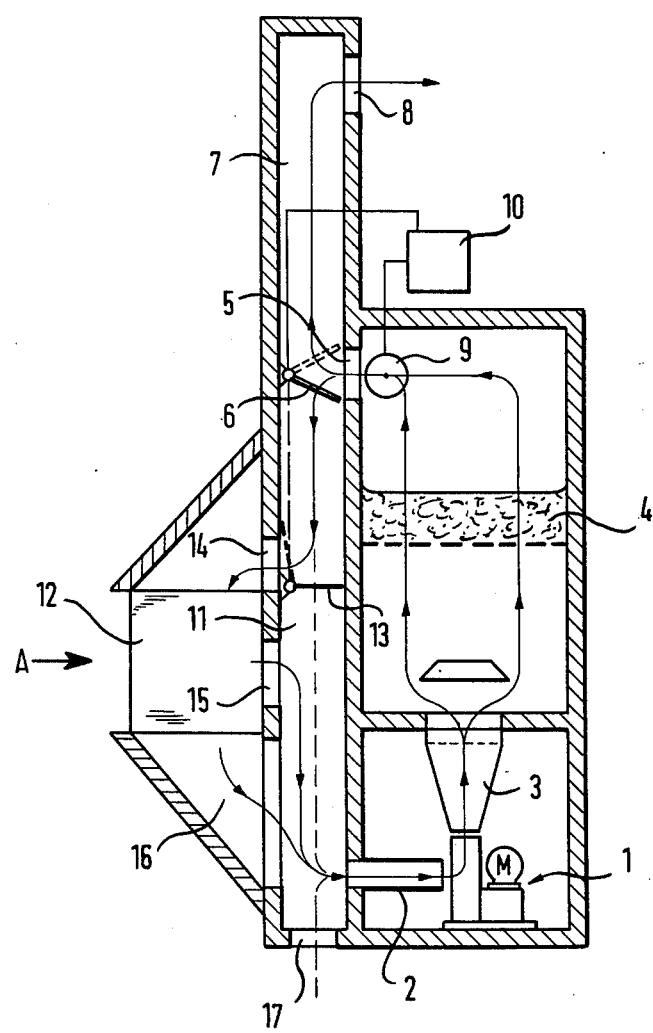
FIG. 3 is a schematic view in cross-sectional side elevation of a second embodiment of apparatus for carrying out the kiln-drying process of the invention.

FIG. 3 shows diagrammatically an apparatus for withering green malt. This contains the motor-driven ventilator 1, the suction pipe 2 through which conditioned fresh air is sucked in and the blower channel 3 from which the conditioned fresh air passes to the kiln 4. A temperature measurement device 9 is also provided, which is located in the waste air current leaving the kiln 4. The waste air can pass to the atmosphere through the waste air pipe 7 and the opening 8.

A valve 6 is also provided, which can be regulated by the valve adjustment motor 10 depending on the temperature measurement device 9. All or part of the waste air can be diverted to the recycle air pipe 11 by means of the valve 6. A further valve 13 is provided in the recycle air pipe 11 which, in the position shown in the diagram, shuts the recycle air pipe 11 at the level of a heat exchanger 12 and passes the recycle air through an opening 14 to the heat exchanger 12. Fresh air passes into the other inlet of the heat exchanger 12, as indicated by the arrow A. The fresh air leaving the heat exchanger passes to the recycle air pipe 11 again through the opening 15. The same is also true of the recycle air passed through the heat exchanger 12. This leaves the heat exchanger through the pipe 16 and likewise reaches the recycle air pipe 11 and then the suction pipe 2. A known glass plate heat exchanger is for example suitable as heat exchanger.

The operation of the illustrated apparatus is as follows: If the valve 6 is in the upper position (shown by dotted lines) or in an intermediate position during operation, all or a part of the waste air is diverted to the recycle air pipe 11 and passes, with the valve 13 in the closed position (lines shown in the Figure) through the opening 14 to the heat exchanger 12. In the heat exchanger 12 the recycle air gives up a part of its heat content to the fresh air introduced into the heat exchanger 12 in the direction of the arrow A, thereby heating the fresh air. The heated fresh air leaves the heat exchanger 12 through the opening 15 and passes to the lower part of the recycle air pipe 11. The heated fresh air is there combined with recycle air passed through the heat exchanger 12 and the thus conditioned fresh air is sucked into the suction pipe 2 together with the recycle air leaving the heat exchanger. The conditioned air is introduced by the motor-driven ventilator 1 through the blower channel 3 and into the kiln 4, where it is used to dry the green malt. It is of course also possible to set the valve 13 in the upper position as shown by the dotted lines, so that the opening 14 is closed. The fresh air may then also be sucked in through the opening 17 and combined with the recycle air introduced into the recycle air pipe 11 before entering the suction pipe, as shown by the dotted lines. The valve 13 can in this case also be regulated by means of the valve adjustment motor 10, as shown by the dotted lines.

It will be evident to those skilled in the art that many modifications and variations are possible within the spirit and scope of this invention, which is limited only by the following claims.

I claim:

1. In a process for the preparation of pale malt comprising the steps of steeping corn and subsequently germinating said corn to produce green malt and thereafter kiln-drying said green malt to produce pale malt, said kiln drying including the steps of withering said green malt by passing a first inlet air stream at a temperature of up to 60° C through said green malt for a time sufficient to wither said malt, whereby a first exhaust air stream containing moist air issues from said malt during said withering; and passing a second inlet air stream through said malt after said withering at a temperature of up to 85° C for a time sufficient to dry the malt, the improvement comprising humidifying the air for said first inlet air stream.

2. A process according to claim 1, wherein said humidifying is carried out by recycling at least a portion of said first exhaust air stream as a recycle stream into said first inlet air stream prior to the passage of said first inlet air stream through said green malt.

3. A process according to claim 2, further including the step of adjusting the proportion of said first exhaust air stream recycled in dependence on the temperature of said first exhaust air stream.

4. A process according to claim 2, wherein said recycle stream is heat-exchanged with additional air for said first inlet air stream, and wherein said recycle stream and said additional air are mixed after said heat-exchange.

5. A process according to claim 4, wherein less than 100% of the additional air necessary for said first inlet air stream is heat-exchanged with said recycle stream.

6. A process according to claim 1, wherein said air for said first inlet air stream is humidified to the highest attainable water content.

* * * * *